United States Patent Office 3,022,844
Patented Feb. 27, 1962

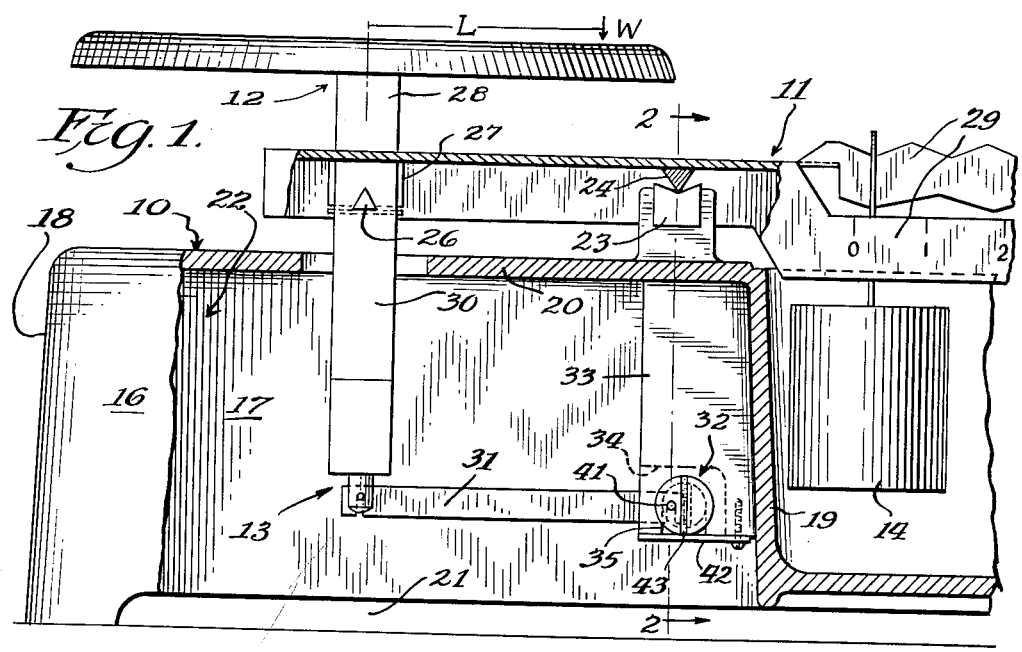
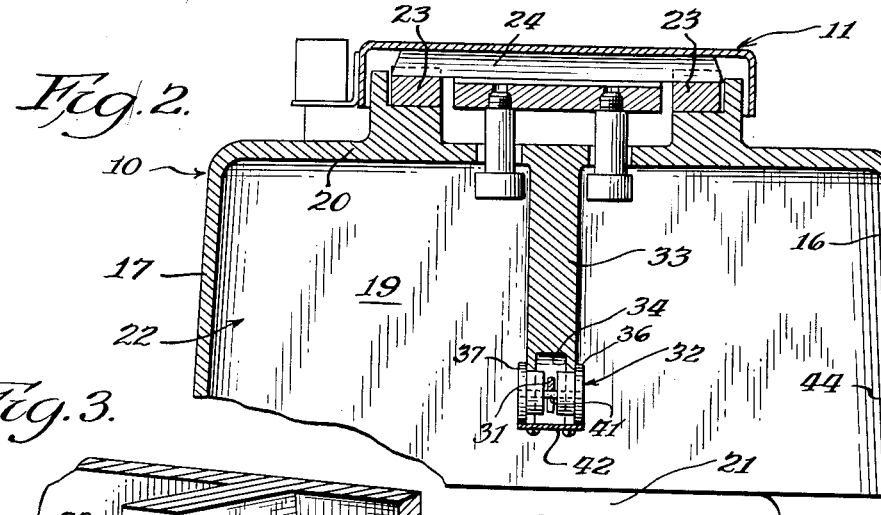
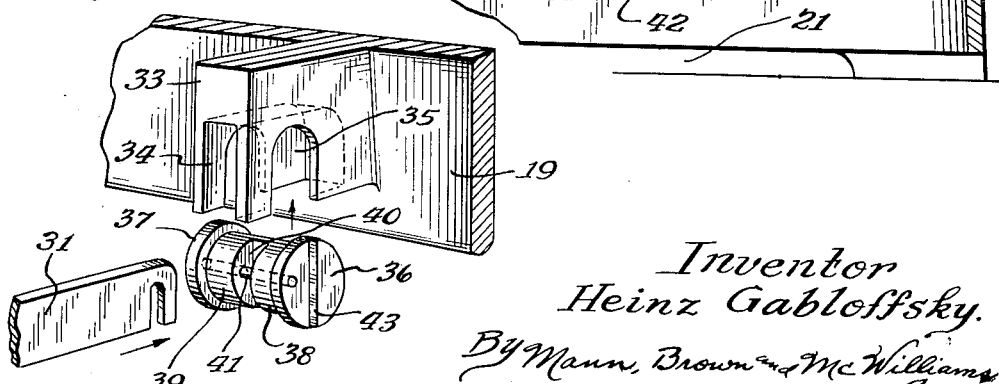
Inventor
Heinz Gabloffsky.
By Mann, Brown and McWilliams
Attys

3,022,844
SHIFT ERROR ADJUSTMENT FOR BEAM
BALANCES OF STABILIZED PAN TYPE
Heinz Gabloffsky, Chicago, Ill., assignor, by mesne assignments, to Cenco Instruments Corporation, Chicago, Ill., a corporation of Delaware
Filed June 6, 1956, Ser. No. 589,729
2 Claims. (Cl. 177—190)

This invention relates to a simplified adjustment for compensating and correcting shift errors in beam balances of the stabilized pan type.

Such balances incorporate the Roberval principle for stabilizing the weighing pan and this requires that the members comprising the stabilizing system form a parallelogram, i.e., the two upright members must be parallel and of equal length and also, the two horizontal members must be parallel and of equal length. In theory, when the load on the pan is off center with respect to the upright member associated with the pan, inaccuracies will appear if the parallelogram is not maintained.

Practically speaking, the assumptions underlying Roberval's theory are never fully satisfied. The weigh beam as well as the stabilizing linkages are of finite dimension and the mass of each acts at its center of gravity. Furthermore, the main fulcrum and the pan fulcrum are not in alignment with the action points of the poises, nor can they be maintained in any predetermined alignment due to the fact that there is a limited degree of flexure of the beam. This flexure, of course, is variable, with the location of the poises on the beam.

It is the principal object of the present invention to provide a simplified adjustment in the stabilizing linkage system which permits shift errors to be eliminated.

It should be recognized that such adjustments upset the parallelogram relationship previously referred to, but this not to say that the accuracy of the arrangement is in any way impaired. Due to the inherent discrepancies in any physical system, shift errors can not actually be compensated by depending only upon the Roberval principle. Actually, true compensation is accomplished by recognizing that the torques, which are set up by an eccentric loading of the pan, are to be balanced out by the action of the stabilizing linkage and this may be accomplished in a variety of ways. In the prior art, these shift error adjustments have commonly been associated with the pan hanger and usually consist of a threaded screw for varying the effective length of the upright that forms the left-hand side of the stabilizing linkage. Incorporating this adjustment into the pan hanger construction has necessitated unduly complex arrangements that are not only difficult to adjust but also excessively costly.

The present invention simplifies the overall arrangement of a beam balance that includes a stabilized pan assembly by locating the shift error adjustment in the fixed center post portion of the balance, rather than in the movable pan hanger portion. As a further feature, the invention employs a self-locking rotatable cam for carrying out the adjustment. It is, of course, recognized that the circular motion of the cam involves both horizontal and vertical components of movement, and, while only the vertical component is desired for effecting compensating action and is, in fact, very sensitive for this purpose, it has been found that the horizontal component has no appreciable effect on the stabilizing action of the linkage system. Furthermore, the camming motion is centered about the horizontal plane and is limited to slight angular movements above and below this plane such that vertical components of movement predominate over the horizontal components.

Other objects and advantages of this invention will be apparent during the course of the following description.

In the accompanying drawings forming a part of this specification, and in which like numerals are employed to designate like parts throughout the same:

FIG. 1 is a fragmentary front elevational view of a typical beam balance, with parts broken away and sectioned, and illustrates the incorporation of the adjustment of the present invention.

FIG. 2 is a sectional view taken on the line 2—2 of FIGURE 1; and

FIG. 3 is an enlarged perspective view of the cam mounting arrangement.

Generally speaking, the balance comprises a base portion 10, a weigh beam 11 supported on the base, a pan hanger assembly 12, suspended from one end of the beam 11 and including a stabilizing system 13 connected to the base 10, and one or more poises 14 suspended from the opposite end of the beam.

The base includes front and rear walls 16 and 17 respectively, end walls 18 and 19, and top and bottom walls 20 and 21 that define a hollow chamber 22 in which the stabilizing system 13 is housed. The top wall 20 supports a pair of agates 23 that cooperate with a knife edge 24 carried by the weigh beam 11. The agates 23 and knife edge 24 constitute the main fulcrum of the balance.

The weigh beam carries a second knife edge 26 that cooperates with a pair of agates 27 carried by the upright member 28 associated with the weigh pan 12. The weigh beam is also shown as including the conventional beam scales 29 from which poises 14 are suspended.

The pan 12 is illustrated as being eccentrically loaded by a weight W acting at a lever arm L with respect to the center of the pan and the present invention is concerned with providing a stabilizing system for eliminating errors caused by this eccentric loading of the pan.

The illustrated eccentric loading will set up a torque about the pivot point defined by knife edge 26 and this torque must be compensated by the stabilizing system 13. According to the present invention, the stabilizing system takes the general form of a parallelogram, though it is specifically recognized herein that it need not be an exact parallelogram. The system includes a movable upright leg 30, which is, in effect, an extension of the upright 28 associated with the weigh pan, a substantially horizontal leg in the form of a link 31, pivotally connected at one end to upright 30 and at its other end to a cam 32 that is rotatably mounted in a center post structure 33 that extends downwardly from the top wall 20 and the base housing at a point immediately beneath knife edge 24. For strength, the center post structure preferably merges with side wall 19 of the base housing, thus, it will be seen that the center post forms one leg of the stabilizing system and the portion of the beam between the knife edges 24 and 26 forms the other leg of the arrangement.

As will become apparent from the following description, slight rotary adjustments of cam 32 cause the linkage system to develop a compensating action that counterbalances the vector set up at knife edge 26. The cam mounting (see FIG. 3) is accommodated by providing the free lower end of the center post with longitudinal and transverse intersecting slots 34 and 35, respectively. Slot 35 accommodates the cam which is of generally cylindrical shape and comprises front and rear circular outer shoulders 36 and 37, respectively, front and rear inner circular shoulders 38 and 39, respectively, separated by a three-quarter diameter sawcut slot 40, in which a cam pin 41 is mounted in eccentric relation.

The cam is inserted upwardly into slot 35 and is held in place therein by a leaf spring 42 which holds the cam against the upper surface of the slot and frictionally resists undesired rotary movement. It will be noted that the outer shoulders 36 and 37 abut against the adjacent outer surfaces of the center post and hold the cam against transverse movement relative to the base. Slot 34 on the other hand, accommodates link 31 which is pivotally connected on the pin 41.

It is important to note that the cam 32 is oriented in the post with the pin 41 lying in the horizontal plane of the axis of the cam so that, upon slight rotations of the cam, in either direction, the vertical components of movement will predominate over the horizontal components. In this relationship, it has been found that this cam arrangement provides a sensitive adjustment for shift errors that may exist in the balance. The fact that there is a slight horizontal component of movement developed by the pin 41 and hence, by link 31, does not in any way impair the effectiveness of the desired adjustment. As shown, the front outer shoulder 36 of the cam is formed with an actuating slot 43 and the front wall 16 of the base housing is formed with an aperture 44 coaxial with the cam to afford access for a screw driver or similar tool for positioning the cam as desired.

It is pertinent to an understanding of the invention that one realize that the line of action of the leg formed by the portion of the beam between the main fulcrum and pan fulcrum action points of knife edges 24 and 26 is to be compensated by adjusting link 31 until the line of action determined by its opposite pivot points is parallel to the effective line of action of the beam. Since the flexure of the beam varies with the pan loading, the line of action of knife edges 24 and 26 is variable with loading and the conveniently adjustable stabilizing system of the invention facilitates individual adjustments for the various load conditions and permits such adjustments with the weight disposed on the pan.

Thus, it will be seen that the objects of this invention have been accomplished in that the shift error adjustment is incorporated into a fixed portion of the balance, namely, the center post, and this not only results in a simplified and sensitive arrangement but also, simplifies the actual adjustment operation. The arrangement avoids complicated and costly casting constructions such as are found in prior art devices and keeps the number of movable parts to a bare minimum.

It should be understood that the description of the preferred form of the invention is for the purpose of complying with section 112, title 35 of the United States Code, and that the appended claims should be construed as broadly as the prior art will permit.

I claim:

1. In a balance including a base providing a main fulcrum, a beam pivoted at an intermediate point on said main fulcrum and providing a pan fulcrum adjacent one end, a pan assembly having an upright carrying a pan at its upper end and pivoted at an intermediate point on said pan fulcrum, and a substantially horizontal stabilizing link mounted at one end in relative pivotal relation to said base and at the other end in relative pivotal relation to the lower end of said upright, said link forming one leg of a four-sided stabilizing system with the other legs being formed by said upright, said beam and said base; the improvement wherein said base includes a vertically extending center post structure arrangement underneath said main fulcrum and terminating at its bottom end in a mounting socket provided by intersecting slots, one of which opens downwardly and the other of which opens transversely, and a rotatable member mounted in said socket and rotatable therein and including an eccentric portion pivotally connected to the other end of said link such that rotation of said member varies the vertical position of the link to bring the line of action of the link into substantial parallelism with the line of action defined between said main fulcrum and said pan fulcrum, and means fixed to said base for holding said member in any selected rotational position within said socket.

2. In a balance including a base providing a main fulcrum, a beam pivoted at an intermediate point on said main fulcrum and providing a pan fulcrum adjacent one end, a pan assembly having an upright carrying a pan at its upper end and pivoted at an intermediate point on said pan fulcrum, and a substantially horizontal stabilizing link mounted at one end in relative pivotal relation to said base and at the other end in relative pivotal relation to the lower end of said upright, said link forming one leg of a four-sided stabilizing system with the other legs being formed by said upright, said beam and said base; the improvement wherein said base includes a vertically extending center post structure arrangement underneath said main fulcrum and terminating at its bottom end in a mounting socket extending normal to the plane of said stabilizing system, and means including a rotatable member mounted in stable relation in said socket and rotatable therein and including an eccentric portion pivotally connected to the other end of said link such that manual rotation of said member varies the vertical position of the link to bring the line of action of the link into substantial parallelism with the line of action defined between said main fulcrum and said pan fulcrum.

References Cited in the file of this patent

UNITED STATES PATENTS

| | | |
|---|---|---|
| 960,905 | Hansen | June 7, 1910 |
| 1,213,295 | Strubler | Jan. 23, 1917 |
| 1,410,614 | Smith | Mar. 28, 1922 |
| 1,439,203 | Thomas | Dec. 19, 1922 |
| 1,591,594 | Wetzel | July 6, 1926 |
| 2,634,966 | Williams | Apr. 14, 1953 |
| 2,795,299 | Batori | June 11, 1957 |

FOREIGN PATENTS

| | | |
|---|---|---|
| 2,207 | Great Britain | Feb. 17, 1885 |
| 271,737 | Great Britain | June 2, 1927 |
| 997,311 | France | Sept. 12, 1951 |
| 724,360 | Great Britain | Feb. 16, 1955 |